United States Patent [19]

Mizuno et al.

[11] Patent Number: 5,017,663
[45] Date of Patent: May 21, 1991

[54] RESIN COMPOSITION

[75] Inventors: Yukio Mizuno, Ehime; Takashi Maruyama, Ibaraki; Shinichi Yachigo, Osaka, all of Japan

[73] Assignee: Sumitomo Chemical Co., Ltd., Osaka, Japan

[21] Appl. No.: 510,216

[22] Filed: Apr. 18, 1990

[30] Foreign Application Priority Data

Apr. 18, 1989 [JP] Japan ................................. 1-99732

[51] Int. Cl.$^5$ ...................... C08G 65/48; C08L 77/06; C08L 77/10; C08K 5/32
[52] U.S. Cl. .................................... 525/397; 525/905; 524/260
[58] Field of Search ........................ 525/397; 524/260

[56] References Cited

U.S. PATENT DOCUMENTS 4,315,086  2/1982  Ueno et al. .
4,885,338  12/1989 Takao et al. .................. 525/377
4,970,272  11/1990 Gallucci ........................ 525/397

FOREIGN PATENT DOCUMENTS 253365    1/1988  European Pat. Off. .
43-017812 7/1968  Japan .
49-098858 9/1974  Japan .

Primary Examiner—Melvyn I. Marquis
Assistant Examiner—Thomas Hamilton, III
Attorney, Agent, or Firm—Cushman, Darby & Cushman

[57] ABSTRACT

The present invention provides a thermoplastic resin composition which is improved in compatibility between polyphenylene ether and polyamide and is excellent in processability and impact strength. This resin composition comprises:

100 parts by weight of a composition comprising
  (A) 5-95% by weight of a polyphenylene ether resin and
  (B) 95-5% by weight of a polyamide and 0.01-10 parts by weight, based on said composition comprising (A) and (B), of (D) a compound comprising dinitrodiamine represented by the formula (I):

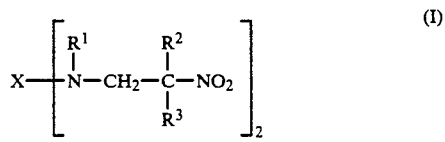

wherein X represents a divalent chain aliphatic, cycloaliphatic or aromatic group which may contain halogen or oxygen, $R^1$ represents a hydrogen atom, a chain aliphatic group, a cycloaliphatic group or an aromatic group and when X and $R^1$ are both chain aliphatic groups, the nitrogen atoms may further link to each other through $R^1$; $R^2$ and $R^3$ each represents a hydrogen atom or an alkyl group of 1-12 carbon atoms and $R^2$ and $R^3$ may link to each other to form a ring. Preferably this composition further contains a rubber-like polymer for remarkably increasing impact strength.

2 Claims, No Drawings

RESIN COMPOSITION

BACKGROUND OF THE INVENTION

The present invention relates to a resin composition which comprises a polyphenylene ether resin and a polyamide.

More particularly, it relates to a novel thermoplastic resin composition which comprises a resin composition comprising a polyphenylene ether resin and a polyamide, to which are added a compound comprising a dinitrodiamine and, if necessary, a rubber-like polymer. This thermoplastic resin composition is excellent in solvent resistance, flowability, mechanical properties and processability.

The composition of the present invention can be made into shaped articles, sheets, or films by injection molding, extrusion molding, etc.

Polyphenylene ether is superior in mechanical properties, heat resistance, electrical properties, and besides dimensional stability and has been noticed as a resin suitable for various uses, but it is inferior in processability, impact strength and solvent resistance against chemicals such as gasoline.

In order to improve processability and impact strength, blends of polyphenylene ether with polystyrene or rubber-reinforced polystyrene have been proposed in Japanese Patent Kokoku No. 43-17812 and Japanese Patent Kokai No. 49-98858. However, these resin compositions are also inferior in solvent resistance.

Resin compositions comprising rubber-reinforced polystyrene/polyphenylene ether have excellent impact strength and processability and are industrially mass-produced. However, they are limited in their uses due to their inferior solvent resistance.

On the other hand, polyamide is a thermoplastic resin superior in heat resistance, rigidity, strength and oil resistance, but are poor in processability and impact resistance and besides high in water-absorption and thus causes considerable change in properties and dimension in practical use. Thus, further improvement has been desired.

If blending a polyphenylene ether and a polyamide provides a resin composition maintaining the advantages of these resins and improves in processability and impact resistance, such a resin composition would be expected to have new uses. However, polyphenylene ether and polyamide much differ in melt viscosity from each other and have been considered to be very poor in compatibility.

In fact, mere mixing of these resins results in the following problems, and practical molded articles cannot be obtained therefrom.

(1) The molten polymers much differ in viscosity and so stable taking-off of extruded strands is nearly impossible and molding workability is also much inferior.

(2) Mechanical properties, especially impact resistance of molded articles is lower than those of respective resins.

In this regard, Japanese Patent Publication (Kokoku) No. 60-11966 and Japanese Patent Publication (Kokai) Nos. 56-47432, 57-10642 and 60-58463 proposed improvements by using additives having reactivity or compatibility with these resins.

The inventors have already found a resin composition which is excellent in mechanical properties and solvent resistance, good in processability and well balanced in properties and which comprises a blend of a polyphenylene ether, a polyamide and an amino resin and have filed a patent application therefor (Japanese Patent Application No. 63-127391). However, this resin composition is not sufficient yet in mechanical properties for practical uses.

The principal object of the present invention is to provide a practical resin composition which is improved in compatibility between polyphenylene ether and polyamide and which is excellent in solvent resistance as well as heat resistance and impact strength.

As a result of intensive research conducted by the inventors in an attempt to develop a technique effective to improve resin compositions comprising polyphenylene ether and polyamide, it has been found that a resin composition excellent in solvent resistance, mechanical properties, heat resistance, and processability can be obtained by adding a compound comprising a dinitrodiamine and, if necessary, a rubber-like polymer to a resin composition comprising a polyphenylene ether resin and a polyamide.

That is, the present invention relates to a resin composition which comprises:

100 parts by weight of a composition comprising (A) 5-95 % by weight of a polyphenylene ether resin and (B) 95-5 % by weight of a polyamide, and (C) 0-100 parts by weight of a rubber-like polymer, and (D) 0.01-10 parts by weight of a compound comprising a dinitrodiamine represented by the formula (I):

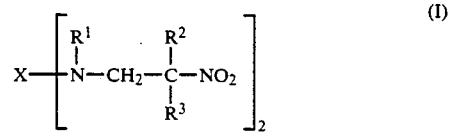

(wherein X represents a divalent chain aliphatic, cycloaliphatic or aromatic group which may have halogen or oxygen ; $R^1$ represents a hydrogen atom, a chain aliphatic group, a cycloaliphatic group or an aromatic group and when X and $R^1$ are both chain aliphatic groups, the nitrogen atoms may further link to each other through $R^1$; and $R^2$ and $R^3$ each independently represents a hydrogen atom or an alkyl group of 1-12 carbon atoms and $R^2$ and $R^3$ may link to each other to form a ring).

The present invention further relates to a resin composition which comprises the above-mentioned resin composition to which is added (M) an aromatic vinyl polymer, a copolymer of an aromatic vinyl compound and other monomer or a rubber-modified aromatic vinyl polymer.

The polyphenylene ether resin (A) means a polyphenylene ether and/or a modified polyphenylene ether.

The polyphenylene ether (A) is a polymer obtained by oxidation polymerization of a phenol compound represented by the formula (II):

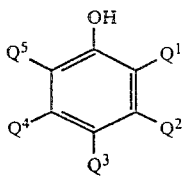

(wherein $Q^1$, $Q^2$, $Q^3$, $Q^4$ and $Q^5$ each represents a hydrogen atom, a halogen atom, a hydrocarbon residue or a substituted hydrocarbon residue and one of them is a hydrogen atom) with oxygen or a gas containing oxygen using an oxidation coupling catalyst.

Examples of $Q^1$, $Q^2$, $Q^3$, $Q^4$ and $Q^5$ in the above formula (II) are hydrogen atom, chlorine atom, fluorine atom, bromine atom, iodine atom, methyl group, ethyl group, propyl group, butyl group, chloroethyl group, hydroxyethyl group, phenylethyl group, benzyl group, hydroxymethyl group, carboxyethyl group, methoxycarbonylethyl group, cyanoethyl group, phenyl group, chlorophenyl group, methylphenyl group, dimethylphenyl group and ethylphenyl group.

Examples of the phenol compounds shown by the above formula are phenol, o-, m- or p-cresol, 2,6-, 2,5- 2,4- or 3,5-dimethylphenol, 2-methyl-6-phenylphenol, 2,6-diphenylphenol, 2,6-diethylphenol, 2-methyl-6-ethylphenol, and 2,3,5-, 2,3,6-, or 2,4,6-trimethylphenol. These phenol compounds may be used singly or in combination of two or more.

Further, the polyphenylene ether may be copolymers of a phenol compound of the above formula and another phenol compound, for example, dihydric phenols such as bisphenol A, tetrabromobisphenol A, resorcin, and hydroquinone.

Among them, especially preferred are homopolymers and copolymers of 2,6-dimethylphenol and 2,3,6-trimethylphenol.

Any oxidation coupling catalysts can be used for oxidation polymerization of the phenol compounds as far as they have polymerization ability. Typical examples thereof are catalysts comprising cuprous salt and tert. amine such as cuprous chloride/trimethylamine, cuprous acetate/triethylamine and cuprous chloride/pyridine; catalysts comprising cupric salt/tert. amine and alkali metal hydroxide such as cupric chloride/pyridine/potassium hydroxide; catalysts comprising manganese salt and primary amine such as manganese chloride/ethanolamine and manganese acetate/ ethylenediamine; catalysts comprising manganese salt and alcoholate or phenolate such as manganese chloride/sodium methylate and manganese chloride/sodium phenolate; catalysts comprising manganese salt, alkali hydroxide and amine such as manganese chloride/NaOH/diethanolamine/dibutylamine, manganese chloride/NaOH/triethanolamine/dibutylamine and manganese chloride/NaOH/monoethanolamine/ dibutylamine; and catalysts comprising cobalt salt and tert. amine.

Intrinsic viscosity (measured in chloroform at 30° C.) of the polyphenylene ether used in the present invention has no special limitation, but preferably is 0.2-1.0 dl/g, more preferably 0.25-0.6 dl/g and optimum intrinsic viscosity may be selected depending on circumstances.

Polyamide (B) used in the present invention may be any polyamide which has a bond

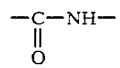

in its polymer main chain and can be molten by heating.

Typical examples of (B) are 4-nylon, 6-nylon, 6,6-nylon, 12-nylon, 6,10-nylon, polyamide prepared from terephthalic acid and trimethylhexamethylenediamine, polyamide prepared from adipic acid and m-xylylenediamine, polyamide prepared from adipic acid, azelaic acid and 2,2-bis(p-aminocyclohexyl)-propane, polyamide prepared from terephthalic acid and 4,4'-diaminodicyclohexylmethane, polyamide prepared from isophthalic acid, isophoronediamine and laurolactam, polyamide prepared from isophthalic acid, 4,4'-diamino-3,3'-dimethyldicyclohexylenemethane and laurolactam, and polyamide prepared from isophthalic acid, terephthalic acid, hexamethylenediamine and 2,2-bis(p-aminocyclohexyl)-methane. These may be used singly or as a mixture or copolymer of two or more of them.

Mixing ratio of polyphenylene ether resin (A) and polyamide (B) is such that polyphenylene ether resin is 5-95 % by weight and polyamide is 95-5 % by weight. If amount of polyamide is less than 5 % by weight, effect to improve solvent resistance is small and if it is more than 95 % by weight, thermal properties such as heat distortion temperature tend to deteriorate.

Compound (D) comprising a dinitrodiamine, which plays the most important role in improving compatibility between polyphenylene ether resin (A) and polyamide (B) in the composition of the present invention, is represented by the formula (I):

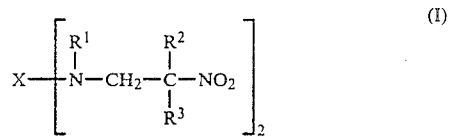

(wherein X represents a divalent chain aliphatic, cycloaliphatic or aromatic group which may contain halogen or oxygen, $R^1$ represents a hydrogen atom, a chain aliphatic group, a cycloaliphatic group or an aromatic group, and when both the X and $R^1$ are chain aliphatic groups, the nitrogen atoms may further link to each other through $R^1$, $R^2$ and $R^3$ each independently represents a hydrogen atom or an alkyl group of 1-12 carbon atoms and $R^2$ and $R^3$ may link to each other to form a ring).

The dinitrodiamines represented by the above formula (I) can be easily produced by condensation reaction of a diamine, a nitroalkane and formaldehyde as starting materials in an inert solvent such as methanol. A small amount of an alkaline compound may be used as a catalyst to accelerate the reaction.

As examples of the compounds comprising dinitrodiamines, mention may be made of the following compounds wherein Z represents

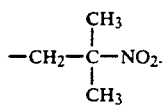
| | |
|---|---|
| Z—NH(CH₂)₂NH—Z | (1) |
| Z—NH(CH₂)₃NH—Z | (2) |
| Z—NH(CH₂)₄NH—Z | (3) |
| Z—NH(CH₂)₆NH—Z | (4) |
| Z—NH(CH₂)₁₀NH—Z | (5) |
| Z—NH(CH₂)₁₂NH—Z | (6) |
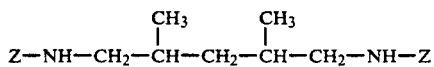 (7)
 (8)
 (9)
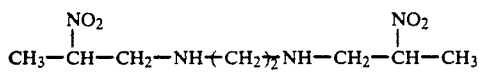 (10)
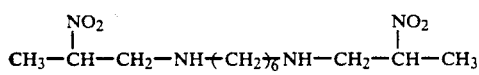 (11)
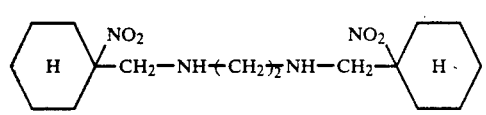 (12)
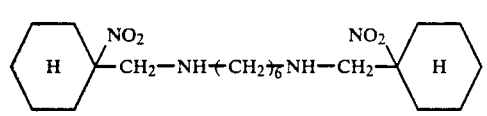 (13)
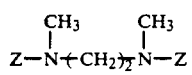 (14)
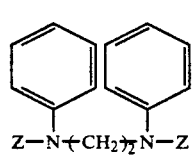 (15)
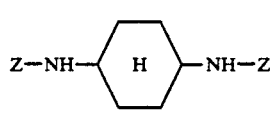 (16)
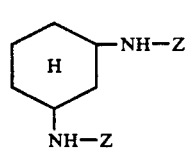 (17)
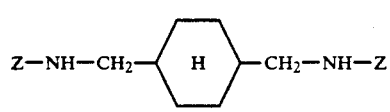 (18)
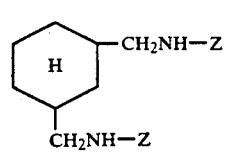 (19)

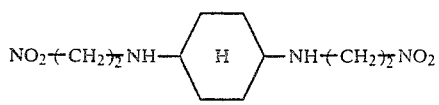 (20)
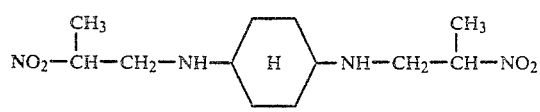 (21)
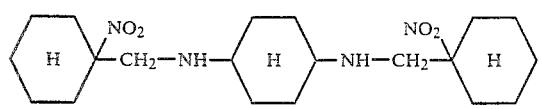 (22)
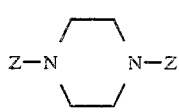 (23)
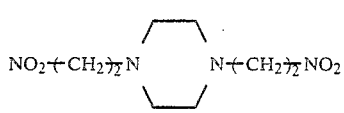 (24)
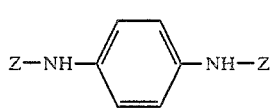 (25)
 (26)
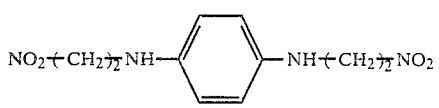 (27)
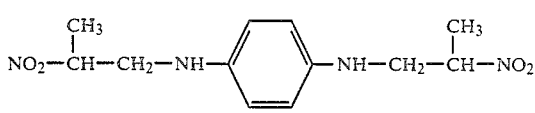 (28)
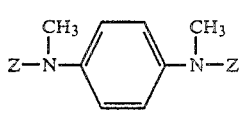 (29)
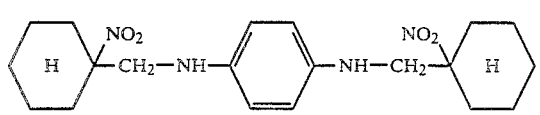 (30)
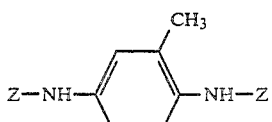 (31)
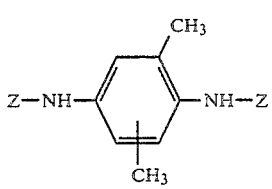 (32)

-continued
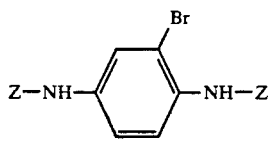 (33)
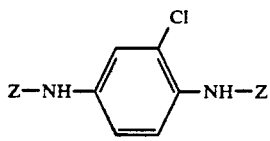 (34)
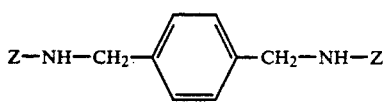 (35)
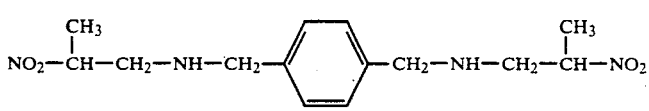 (36)
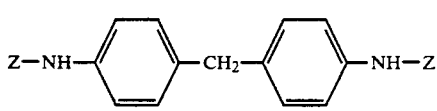 (37)
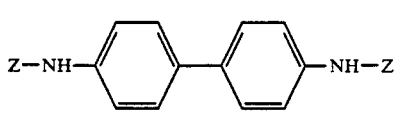 (38)
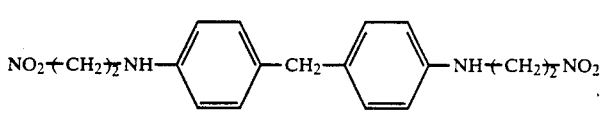 (39)
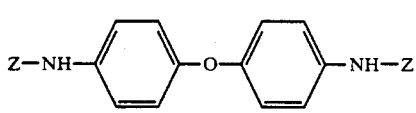 (40)
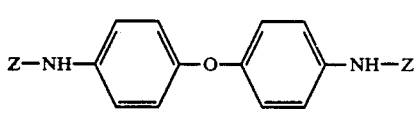 (41)
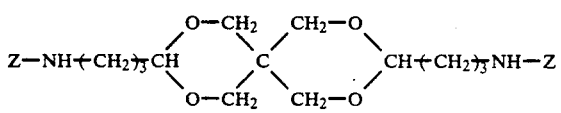 (42)
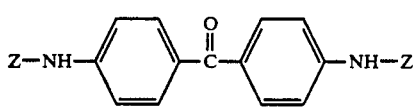 (43)
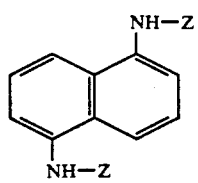 (44)

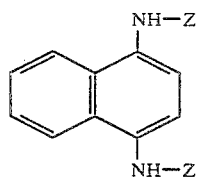 (45)

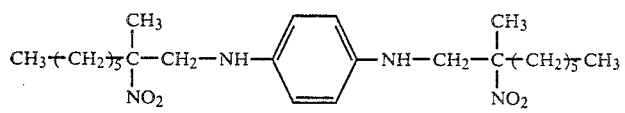 (46)

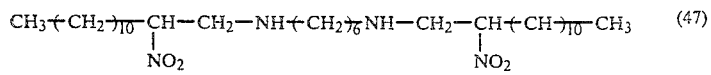 (47)

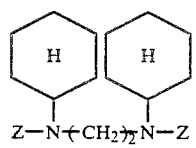 (48)

As shown above, the substituent X in the above formula (I) is a divalent chain aliphatic group, cycloaliphatic group or aromatic group and it may contain halogen as in the above compounds (33) and (34) and may contain oxygen as in the compounds (40)–(43). X is preferably a chain aliphatic group and most preferably a chain aliphatic group of 4–12 carbon atoms.

$R^1$ in the formula (I) is a hydrogen atom, a chain aliphatic group, a cycloaliphatic group or an aromatic group and when both X and $R^1$ are chain aliphatic groups, the nitrogen atoms may link to each other through $R^1$ so that a ring is formed by X, $R^1$ and the two nitrogen atoms as in the compounds (23) and (24).

$R^2$ and $R^3$, which may be identical or different, each represents a hydrogen atom or an alkyl group of 1–12 carbon atoms. $R^2$ and $R^3$ may link to each other to form a ring as in the above compounds (12), (13), (22) and (30).

The compound (D) comprising dinitrodiamine may be a single compound or a mixture of two or more compounds and besides may be a mixture with fillers such as silica and talc as described later or may be a mixture with other additives. Thus, compound (D) may be used in any of these forms.

Addition amount of compound (D) is 0.01–10 parts by weight, preferably 0.1–5 parts by weight based on 100 parts by weight of a composition comprising polyphenylene ether resin (A) and polyamide (B). If the amount is less than 0.01 part by weight, the improvement aimed at by the present invention is insufficient and when more than 10 parts by weight, no further improvement is obtained.

In order to remarkably increase impact strength, it is preferred to add rubber-like polymer (C) as an impact strength modifier to the present resin composition.

The rubber-like polymer (C) used in the present invention means a natural or synthetic polymer which is elastic at room temperature, for example, 20–25° C. Examples of the rubber-like polymer (C) are natural rubber, diene rubbers such as polybutadiene, polyisoprene, and polychloroprene; copolymers of diene and vinyl monomer such as styrene-butadiene random copolymer, styrene-butadiene block copolymer, styrene-butadiene-styrene block copolymer, styrene-isoprene random copolymer, styrene-isoprene block copolymer, styrene-isoprene-styrene block copolymer, styrene-grafted polybutadiene, and butadiene-acrylonitrile copolymer; polyisobutylene and copolymers of isobutylene and butadiene or isoprene; ethylene-propylene copolymer and ethylene-propylene-non-conjugated diene copolymer; ethylene-butene-1 copolymer; ethylene-acrylic acid copolymer and alkali metal salts thereof which are so-called ionomers; ethylene-glycidyl acrylate copolymer; ethylene-alkyl acrylate copolymer such as ethylene-ethyl acrylate copolymer and ethylene-butyl acrylate copolymer; thiokol rubber, polysulfid rubber, acrylic rubber, polyurethane rubber, polyether rubber, epichlorohydrin rubber, polyester elastomers and polyamide elastomers.

These rubber-like polymers can be produced by various processes such as emulsion polymerization and solution polymerization and using various catalysts such as peroxides, trialkylaluminum, lithium halides and nickel-based catalysts.

Furthermore, the rubber-like polymer may be one which has various crosslinking degrees, various proportions of micro structures such as cis structure, trans structure and vinyl group or various average rubber particle sizes in resin composition.

Various copolymers such as random copolymers, block copolymers, and graft copolymers may be used as the rubber-like polymers of the present invention.

The rubber-like polymers further include copolymers with monomers such as other olefins, dienes, aromatic vinyl compounds, acrylic acid, acrylic acid esters and methacrylic acid esters, which are prepared by copolymerization at the time of preparation of the rubber-like polymers.

Methods for copolymerization may be any methods such as random copolymerization, block copolymerization and graft copolymerization. As examples of these monomers, mention may be made of ethylene, propylene, styrene, chlorostyrene, α-methylstyrene, butadiene, isoprene, chlorobutadiene, butene-1, isobutylene, methyl acrylate, acrylic acid, ethyl acrylate, butyl acrylate, glycidyl acrylate, methyl methacrylate, acrylonitrile, maleic anhydride and glycidyl methacrylate.

Furthermore, the rubber-like polymers include various modified polymers. Examples thereof are hydroxyor carboxy-terminal modified polybutadienes, partially or completely hydrogenated styrene-butadiene, styrene-butadiene-styrene, styrene-isoprene or styrene-isoprene-styrene block copolymers; rubber-like polymers modified with at least one compound selected from compounds having in its molecule at least one of carboxyl group, amino group, imino group, epoxy group, amide group, vinyl group, isocyanate group and hydroxyl group, acid anhydrides, carboxylic acid esters and oxazoline ring, for example, ethylene-propylene copolymer, ethylene-propylene-non-conjugated diene copolymer, styrene-butadiene copolymer including A—B or A—B—A' block, random or graft copolymer, hydrogenated copolymer thereof, styrene-isoprene copolymer (including A—B or A—B—A' block, random or graft copolymer) and hydrogenated copolymer thereof which are modified with acrylic acid, himic anhydride, glycidyl methacrylate or maleic anhydride. The modification can be performed by known methods such as graft copolymerization and random copolymerization. One or two or more of these rubber-like polymers may be used.

In addition, diene rubbers and copolymers of diene and vinyl compound different in micro structure of double bond, for example, vinyl group, cis-1,4 bond, or trans-1,4 bond may also be used as the rubber-like polymers of the present invention.

Preferred rubber-like polymers include copolymers comprising 40-100 % by weight of butadiene and 60-0 % by weight of styrene, copolymers comprising 35-82 % by weight of butadiene and 65-18 % by weight of acrylonitrile, styrene-butadiene or styrene-butadiene-styrene block copolymers including all of linear block copolymers, radial block copolymers, etc. and hydrogenated products thereof, styrene-isoprene or styrene-isoprene-styrene block copolymers and hydrogenated products thereof, styrene-grafted polybutadiene obtained by adding styrene to polybutadiene or butadiene-styrene copolymer latex and emulsion polymerizing it by radial initiator, ethylene-propylene copolymer and ethylene-propylene-non-conjugated diene copolymer and these polymers modified with at least one compound selected from maleic anhydride, glycidyl methacrylate, acrylonitrile and styrene.

The rubber-like polymer (C) is used in an amount of 0-100 parts by weight, preferably 50 parts by weight or less and more preferably 30 parts by weight or less per 100 parts by weight of the composition comprising polyphenylene ether resin (A) and polyamide (B).

The resin composition of the present invention may further contain at least one of the following compounds to further improve compatibility between polyphenylene ether and polyamide. These compounds include polyfunctional compounds (E), epoxy compounds (J) and organosilane compounds (K).

Polyfunctional compounds (E) are those which have in their molecule at least one of carboxylic acid group, acid anhydride group, acid amide group, imide group, carboxylic acid ester group, epoxy group, amino group and hydroxyl group. Preferred are compounds (F) having in their molecules both (a) a carbon-carbon double bond or a carbon-carbon triple bond and (b) at least one of carboxylic acid group, acid anhydride group, acid amide group, imide group, carboxylic acid ester group, epoxy group, amino group and hydroxyl group.

Examples of the compounds (F) are maleic anhydride, maleic acid, fumaric acid, maleimide, maleic acid hydrazide, reaction products of maleic anhydride and diamine, for example, compounds having the formulas

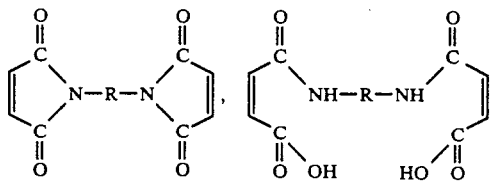

(wherein R is an aliphatic or aromatic group), methylnadic anhydride, dichloromaleic anhydride, maleic acid amide, natural fats and oils such as soybean oil, tung oil, caster oil, linseed oil, hempseed oil, cottonseed oil, sesame oil, rapeseed oil, peanut oil, camellia oil, olive oil, coconut oil and sardine oil; epoxidized natural fats and oils such as epoxidized soybean oil; unsaturated carboxylic acids such as acrylic acid, butenoic acid, crotonic acid, vinylacetic acid, methacrylic acid, pentenoic acid, angelic acid, tiglic acid, 2-pentenoic acid, 3-pentenoic acid, α-ethylacrylic acid, β-methylcrotonic acid, 4-pentenoic acid, 2-hexanoic acid, 2-methyl-2-pentenoic acid, 3-methyl2-pentenoic acid, α-ethylcrotonic acid, 2,2-dimethyl-3-butenoic acid, 2-heptenoic acid, 2-octenoic acid, 4-dodecenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracocenoic acid, mycolipenic acid, 2,4-pentadienoic acid, 2,4-hexadienoic acid, diallylacetic acid, geranic acid, 2,4-decadienoic acid, 2,4-dodecadienoic acid, 9,12-hexadecadienoic acid, 9,12-octadecadienoic acid, hexadecatrienoic acid, linolic acid, linolenic acid, ocatadecatrienoic acid, eicosadienoic acid, eicosatrienoic acid, eicosatetraenoic acid, ricinoleic acid, eleostearic acid, oleic acid, eicosapentaenoic acid, erucinic acid, docosadienoic acid, docosatrienoic acid, docosatetraenoic acid, docosapentaenoic acid, tetracosenoic acid, itaconic acid, hexacosenoic acid, hexacodienoic acid, octacosenoic acid, and triacontenoic acid; and esters, acid amides and anhydrides of these unsaturated carboxylic acids; unsaturated alcohols such as allyl alcohol, crotyl alcohol, methylvinyl carbinol, allyl carbinol, methylpropenyl carbinol, 4-pentene-1-ol, 10-undecene-1-ol, propargyl alcohol, 1,4-pentadiene-3-ol, 1,4-hexadiene-3-ol, 3,5-hexadiene-2-ol, 2,4-hexadiene-1-ol, alcohols represented by the formulas $C_nH_{2n-5}OH$, $C_nH_{2n-7}OH$, $C_nH_{2n-9}OH$ wherein n is a positive integer, 3-butene-1,2-diol, 2,5-dimethyl-3-hexene-2,5-diol, 1,5-hexadiene-3,4-diol and 2,6-octadiene-4,5-diol, and unsaturated amines formed by replacing the OH group of these unsaturated alcohols by an -NH₂ group, low polymers, for example, having an average molecular weight of about 500 - about 10000 such as those of butadiene and isoprene or high polymers, for example, having an average molecular weight of at least 10000 to which maleic anhydride or a phenol is added or into which amino group, carboxylic acid group, hydroxyl group or epoxy group is introduced.

Other preferred polyfunctional compounds (E) are compounds (G) selected from aliphatic carboxylic acids, acid esters and acid amides represented by the formula:

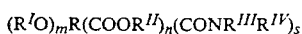

(wherein R represents a straight chain or branched chain saturated aliphatic hydrocarbon residue of 2–20 carbon atoms, $R^I$ each independently represents a hydrogen atom or an alkyl, aryl, acyl or carbonyldioxy group of 1–10 carbon atoms, $R^{II}$ each independently represents a hydrogen atom or an alkyl or aryl group of 1–20 carbon atoms, $R^{III}$ and $R^{IV}$ each independently represents a hydrogen atom or an alkyl or aryl group of 1–10 carbon atoms, and m, n and s each represents 0 or an integer of 1 or more with $m+n+s=>2$) and derivatives of them.

As examples of compounds (G), mention may be made of hydroxyacetic acid, lactic acid, α-hydroxy-n-butyric acid, α-hydroxyisobutyric acid, α-hydroxy-n-valeric acid, α-hydroxyisovaleric acid, 2-hydroxy-2-methylbutanoic acid, α-hydroxy-n-caproic acid, α-hydroxy-isocaproic acid, 2-ethyl-2-hydroxybutanoic acid, 2-hydroxy3,3-dimethylbutanoic acid, 2-hydroxy-2-methylpentanoic acid, 2-hydroxy-5-methylhexanoic acid, 2-hydroxy-2,4-dimethylpentanoic acid, 3-hydroxypropionic acid, β-hydroxybutyric acid, β-hydroxyisobutyric acid, β-hydroxy-n-valeric acid, β-hydroxyisovaleric acid, 2-hydroxymethylbutanoic acid, hydroxypivalic acid, 3-hydroxy-2-methylpentanoic acid, 1,1-hydroxytetradecanoic acid, jalapinolic acid, 1,4-hydroxyhexadecanoic acid, sabinic acid, juniperic acid, hydroxymalonic acid, methyltartronic acid, ethyltartronic acid, n-propyltartronic acid, isopropyltartronic acid, hydroxymethylmalonic acid, hydroxyisopropylmalonic acid, ethylhydroxymethylmalonic acid, malic acid, α-methylmalic acid, α-hydroxy-α'-methylsuccinic acid, α-hydroxy-α',α'-dimethylsuccinic acid, α-hydroxy-α,α'-diethylsuccinic acid, α-hydroxy-α'-ethylsuccinic acid, α-hydroxy-α'-methyl-α-ethylsuccinic acid, trimethylmalic acid, α-hydroxyglutaric acid, β-hydroxyglutaric acid, β-hydroxy-β-methylglutaric acid, α-hydroxyadipic acid, citric acid, isocitric acid, norcaperatic acid, agaricic acid, glyceric acid, α,β-dihydroxybutyric acid, α,β-dihydroxyisobutyric acid, β,β'-dihydroxyisobutyric acid, β,γ-dihydroxybutyric acid, α,β-dihydroxy-β,β-dimethylbutyric acid, α,β-dihydroxy-α-isopropylbutyric acid, ipuroic acid, ustic acid-A, 9,10-dihydroxyoctadecanoic acid, tartaric acid (optically active body or racemic body), mesotartaric acid, methyltartaric acid, α,β-dihydroxyglutaric acid, α,γ-dihydroxyglutaric acid, α,γ-dihydroxy-β-methylglutaric acid, α, γ-dihydroxy-β-methyl-β-ethylglutaric acid, α,γ-dihydroxy-α,γ-dimethylglutaric acid. α,δ-dihydroxyadipic acid, β,γ-dihydroxyadipic acid, 6,7-dihydroxydodecanoic diacid, 7,8-dihydroxyhexadecanoic diacid, furoic acid, trihydroxybutyric acid, trihydroxyisobutyric acid, trihydroxyglutaric acid, succinic acid, glutaric acid, adipic acid, α-methylglutaric acid, and dodecanoic acid.

Furthermore, the derivatives of the above formula include lactones, acid anhydrides, alkali metal salts, alkaline earth metal salts, and salts with amines. As examples thereof, mention may be made of β-propiolactone, glycollide, lactide, β-methylpropiolactone, β,β-dimethylpropiolactone, β-n-propylpropiolactone, β-isopropylpropiolactone. β-methyl-β-ethylpropiolactone, γ-butyrolactone. γ-valerolactone, δ-valerolactone, δ-oaprolactone, ε-caprolactone, 1,5-hydroxypentadecanoic aoid Iaotone, γ-butyro-lactone-α-carboxylic acid, paraconic acid, α-methylparaconic acid, β-methylparaconic acid, α-ethylparaconic acid, α-isopropylparaconic aoid, γ-methylparaconic acid, γ-ethylparaconic acid, α,γ-dimethylparaconic acid, β,γ-dimethylparaconic acid, α,α,β-trimethylparaconic acid, γ,γ-dimethylparaconic acid, nephrosteraic acid, γ-valerolactone-γ-carboxylic acid, γ-isopropyl-γ-butyrolactoneγ-carboxylic acid, α,α-dimethyl-γ-butyrolactone-γ-carboxylic acid, β-methyl-γ-valerolactone-γ-carboxylic acid, α,β-dimethyl-γ-valerolactone-γ-carboxylic acid, α,β-dimethyl-γ-butyrolactone-γ-carboxylic acid, homoisocarpic aoid, α-(γ-oxyoarbonylpropyl)-γ-butyrolactone, β-hydroxyadipic acid-γ-lactone, α,δ-dimethyl-β-hydroxyadipic acid-γ-lactone, β-hydroxy-β-methyladipic acid-γ-lactone, α-(δ'-carboxy-n-butyl)-γ-butylolactone, α-methylisocitric acid lactone, cinchonic acid, α-hydroxy-γ-butyrolactone, β-hydroxy-γ-butyrolactone, δ-hydroxy-γ-valerolactone, pantolactone, mevalonic acid, malic anhydride. tartaric anhydride. hydroxyglutaric anhydride, α,β,γ-trihydroxyvaleric acid Iactone, α-hydroxy-α-hydroxymethyl-γ-butyrolactone. succinic anhydride and glutaric anhydride. These may be used singly or in combination of two or more.

Among them, especially preferred are tartaric acid, malic acid, citric acid and derivatives thereof. These include acids in various commerically available forms, for example, anhydride or hydrate. Examples of useful derivatives are acetyl citrate, monostearyl and/or distearyl citrate, N,N'-diethylcitric acid amide, N,N'-dipropylcitric acid amide, N-phenylcitric acid amide, N-dodecylcitric acid amide, N,N'-didodecylcitric acid amide, N-dodecylcitric acid amide, calcium malate, calcium citrate, potassium malate and potassium citrate.

As other preferred polyfunctional compounds (E), mention may be made of compounds (H) which have in their molecules both (a) acid halide group, most preferably acid chloride group and (b) at least one of carboxylic acid group, carboxylic acid anhydride group, carboxylic acid ester group and carboxylic acid amide group, preferably carboxylic acid group and carboxylic anhydride group.

As examples of compound (H), mention may be made of anhydrotrimellitic acid chloride, chloroformylsuccinic anhydride, chloroformylsuccinic acid, chloroformylglutaric anhydride, chloroformylglutaric acid, chloroacetylsuccinic anhydride, chloroacetylsuccinic acid, trimellitic acid chloride and chloroacetylglutaric acid. Anhydrotrimellitic acid chloride is especially preferred.

These compounds (F), (G) and (H) are mentioned in detail in U.S. Pat. Nos. 4,315,086 and 4,642,358 which are incorporated by reference herein.

Epoxy compound (J) which may be contained in the present composition is an epoxy compound comprising a compound having oxirane group in its molecule and/or a condensation polymer of a dihydric phenol and epichlorohydrin.

Examples of epoxy compound (J) include epoxides of olefins or cycloalkenes such as ethylene oxide, propylene oxide and cyclohexene oxide. They further include condensates of a dihydric phenol and epichlorohydrin at various ratios and typical examples thereof are condensates of bisphenol A and epchlorohydrin, for example, commercially available products such as SUMIEPOXY® ELA-115, ELA-127, ELA-128, ELA-134, ESA-011, ESA-014, ESA-017 and ESA-019 manuractured by Sumitomo Chemical Co., Ltd. and phenoxy resins of Union Carbide Corp., condensates of resorcin and epichlorohydrin, condensates of hydroquinone and epichlorohydrin, condensates of tetrabromobisphenol A and epichlorohydrin, and glycidyl etherification products of phenol novolak or cresol novolak, for example, a product line of SUMIEPOXY ® ESCN-220 manufactured by Sumitomo Chemica. Co., Ltd.

Further included are condensates of polyhydric alcohol and epichlorohydrin and typical examples of the polyhydric alcohols are ethylene glycol, propylene glycol, butylene glycol, polyethylene glycol, polypropylene glycol, glycerine, trimethylolethane, trimethylolpropane and pentaerythritol.

Further included are glycidyl etherification products of monohydric phenols or monohydric alcohols such as phenylglycidyl ether, butylglycidyl ether and cresylglycidyl ether.

Further, mention may be made of glycidylation products of amine compounds, for example, SUMIEPOXY ® ELM-120 supplied by Sumitomo Chemical Co., Ltd. which is a diglycidylation product of aniline.

Furthermore, there may be used polymers of epoxy-containing unsaturated compounds such as glycidyl acrylate, glycidyl methacrylate, and allylglycidyl ether and copolymers of epoxy-containing unsaturated compound and at least one of other monomers such as ethylene, propylene, butene, styrene, α-methylstyrene, 4-methylpenten, chlorostyrene, bromostyrene, acrylic acid, acrylic acid esters, acrylonitrile, vinyl chloride, methacrylic acid, methacrylic acid esters, maleic anhydride and vinyl acetate. Of these polymers especially preferred are styrene-glycidyl acrylate or methacrylate copolymer and ethylene-glycidyl acrylate or methacrylate copolymer.

Organosilane compound (K) which may be contained in the present composition is an organoslilane compound which has in its molecule simultaneously (a) at least one silicon atom which bonds to a carbon atom through an oxygen atom, (b) a carbon-carbon double bond or carboncarbon triple bond, and (c) at least one functional group selected from amino group, mercapto group, carboxylic acid group, acid anhydride group, acid amide group, carboxylic acid ester group, imide group and hydroxyl group.

In these compounds (K), C—O—Si component is usually present as alkoxy group or acetoxy group which directly bonds to silicon atom. Such alkoxy group or acetoxy group generally has less than 15 carbon atoms and may contain hetero-atom such as oxygen atom. Further, in these compounds, there may be present two or more silicon atoms. When two or more silicon atoms are present, these are linked through oxygen atom, for example, in the case of siloxane, or through silicon-silicon bond or through bifunctional organic group, for example, methylene or phenylene group.

Examples of suitable organosilane compounds (K) are γ-aminopropyltriethoxysilane, 2-(3-cyclohexenyl)-ethyltrimethoxysilane, 1,3-divinyltetraethoxysilane, vinyltris(2-methxyethoxy)silane, 5-bicycloheptenyltriethoxysilane and γ-mercaptopropyltrimethoxysilane.

In the present invention, amounts of compounds (E), (F), (G), (H), (J) and (K) can be variously selected depending on object, but usually are 200 parts by weight or less, preferably 80 parts by weight or less, more preferably 20 parts by weight or less, most preferably 0.01-10 parts by weight for 100 parts by weight of polyphenylene ether.

When these various compounds (E), (F), (G), (H), (J) and (K) are used in the present invention, preferably polyphenylene ether is modified with these compounds.

When polyphenylene ether is modified, if necessary, a radical former can be used. The radical formers include known organic peroxides and diazo compounds and preferable examples are benzoyl peroxide, dicumyl peroxide, di-tertbutyl peroxide, tert-butylcumyl peroxide, tert-butyl hydroperoxide, cumene hydroperoxide and azobisisobutyronitrile. Amount of radical former is 0.01-10 parts by weight, preferably 0.1-5 parts by weight for 100 parts by weight of polyphenylene ether.

The resulting modified polyphenylene ether may be a chemical reaction product of the above compound with polyphenylene ether or may be one in which the compound and polyphenylene ether are combined by physical interaction, for example, by physical adsorption to polyphenylene ether.

Furthermore, as preferable modified polyphenylene ethers, mention may be made of those which are obtained by grafting on polyphenylene ether an unsaturated monomer other than the above polyfunctional compound (E) having unsaturated groups, or the polyfunctional compound (E) having unsaturated group and other unsaturated monomer, in the presence of a radical initiator.

Such unsaturated monomers are preferably vinyl and/or vinylidene compounds (L). Examples of these compounds (L) are as follows, aromatic vinyl or vinylidene compounds such as e-methylstyrene, o, m and p-methylstyrene, chlorostyrene, bromostyrene, divinylbenzene, hydroxystyrene, and aminostyrene; olefins such as ethylene; acrylic or methacrylic acid ester compounds such as methyl acrylate or methacrylate, ethyl acrylate or methacrylate, propyl acrylate or methacrylate and octyl acrylate or methacrylate; cyanovinyl compounds such as acrylonitrile and methacrylonitrile; vinyl ester compounds such as vinyl acetate; vinyl ether compounds such as methylvinyl ether, ethylvinyl ether and butylvinyl ether; and unsaturated halogen compounds such as vinyl chloride and vinylidene chloride. These may be used singly or in combination of two or more. Preferable unsaturated monomers to be grafted are styrene, styrene-glycidyl methacrylate, styrene-glycidyl acrylate, styrene-maleic anhydride, styrene-acrylic acid and styrenemethacrylic acid.

In the present invention, amount of compound (L) is 200 parts by weight or less, preferably 0.5-100 parts by weight, more preferably 1-50 parts by weight for 100 parts by weight of polyphenylene ether.

Method for producing modified polyphenylene ether has no limitation and known method can be used. For example, the following methods may be employed.

(1) Polyphenylene ether and the above compound in the form of pellets, powders or fine leaves are uniformly mixed by a high-speed stirrer and then melt kneaded.

(2) The above compound is added to a solution in which polyphenylene ether is dissolved or swollen to dissolve or swell the compound, followed by heating with stirring.

(3) The above compound is added to polyphenylene ether and the mixture is dispersed in water, followed by heating with stirring. In this case, it is preferred to use dispersion stabilizers such as polyvinyl alcohol, sodium dodecylbenzenesulfonate and calcium phosphate. If necessary, solvents which dissolve or swell polyphenylene ether may be added.

In the method (1), temperature and time for melt kneading have no special limitation. Temperature somewhat varies depending on kind and amount of compounds, but generally is 150-350 ° C. Any methods can be employed for melt kneading as far as molten viscous material can be handled and any of batch type and continuous type can be used. Examples of apparatuses are single-screw or multi-screw extruders, Banbury mixer, rolls and kneaders.

Solvents used in the methods (2) and (3) have no special limitation and any solvents may be used as far as they can dissolve or swell polyphenylene ether.

Examples of the solvents are chloroform, methylene chloride, benzene, xylene, chlorobenzene, cyclohexane, styrene, toluene and o-chlorophenol. Mixed solvents may also be used as far as they can dissolve or swell polyphenylene ether. Mixing temperature and time have no limitation, but temperature is generally 20-250° C. and time is generally 1 minute-10 hours.

When modified polyphenylene ether is used in the present invention, it is preferred to previously prepare the modified polyphenylene ether and then mix other components therewith to obtain the resin composition of the present invention, but it is also possible to simultaneously mix the above compound as a modifier, polyphenylene ether and other components to obtain the resin composition.

In practice of the present invention, it is also possible to add other polymers and auxiliaries to the resin composition of the present invention. These other polymers include, for example, polyolefins such as polyethylene, polypropylene, ethylene-propylene block copolymer, polymethylpentene, ethylene-α-olefin copolymers, e.g., ethylene-butene copolymer, ethylene-4-methylpentene copolymer and ethylene-pentene copolymer which have a density of 0.90-0.97 g/cm$^3$; homopolymers and copolymers of various vinyl compounds such as polyvinyl chloride, polymethyl methacrylate, polyvinyl acetate, polyvinylpyridine, polyvinylcarbazole, polyacrylamide, polyacrylonitrile, ethylene-vinyl acetate copolymer and aromatic vinyl polymers; polysulfone, polyether sunfone, polyphenylene sulfide, polycarbonate, polyarylene esters, e.g., U polymer of Unitika Ltd., condensation polymers such as polyacetal; and various thermosetting resins such as silicone resin, fluororesin, polyimide, polyamideimide, phenol resin, alkyd resin, unsaturated polyester resin, epoxy resin and Dapon resin.

Among the above-mentioned other polymers, preferred are polyolefins, (M) aromatic vinyl polymers, copolymers of aromatic vinyl compounds and other monomers and rubber-modified aromatic vinyl polymers.

(M) Aromatic vinyl polymers, copolymers of aromatic vinyl compounds with other monomers or rubbermodified aromatic vinyl polymers are selected from those which have at least 25 % by weight of polymer unit derived from a monomer having the following formula:

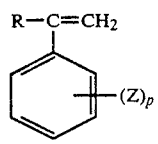

wherein R represents a hydrogen atom, a lower alkyl group such as an alkyl group of 1-4 carbon atoms or a halogen atom, Z represents a hydrogen atom, a vinyl group, a halogen atom, an amino group, a hydroxyl group or a lower alkyl group, and p represents 0 or an integer of 1-5.

As examples of aromatic vinyl polymers and copolymers of aromatic vinyl compounds and other monomers, mention may be made of homopolymers such as polystyrene, polychlorostyrene and poly-o-methylstyrene and copolymers thereof, and stryene-containing copolymers cush as styreneacrylonitrile copolymers, styrene-maleic anhydride copolymer, styrene-glycidyl methacrylate copolymer, styreneacrylic acid copolymer, styrene-N-phenylmaleimide copolymer, styrene-divinylbenzene copolymer and styrene-acrylonitrile-α-methylstyrene copolymer. Among these polymers, preferred are polystyrene, styrene-α-methylstyrene copolymer, styrene-acrylonitrile copolymer, styrene-α-chlorostyrene copolymer, styrene-methyl methacrylate copolymer, styreneglycidyl methacrylate copolymer, styrene-maleic anhydride copolymer and styrene-acrylic acid copolymer.

The rubber-modified aromatic vinyl polymers are those which comprise aromatic vinyl polymer or copolymer matrix in which rubber particles are dispersed to form a two-phase system. They can be produced by mechanical mixing of the above-mentioned rubber-like polymer (C) with aromatic vinyl polymer or copolymer or by dissolving rubber in aromatic vinyl compound monomer, followed by polymerization of the aromatic vinyl compound monomer. According to the latter method, so-called high-impact polystyrenes such as styrene-butadiene rubber-modified polystyrene, ethylene-propylene rubber-modified polystyrene and polybutadiene rubber-modified polystyrene are industrially produced.

These polymers may be previously mixed with polyphenylene ether resin or polyamide as component (A) or component (B) or polyphenylene ether may be modified with the compounds as modifier in the presence of these polymers. Furthermore, it is also possible to simultaneously mix or allow to react the polyphenylene ether resin (A), polyamide (B), compounds (E) - (K) as modifiers, rubber-like polymer (C), compound (D) comprising dinitrodiamine and the above polymer. Other possible sequences of mixing may also be employed.

As the auxiliaries which can be added to the resin composition of the present invention, mention may be made of, for example, reinforcing materials such as glass fiber, carbon fiber, potassium titanate fiber and high-modulus polyamide fiber, inorganic and organic fillers such as carbon black, silica, TiO$_2$, talc, calcium carbonate, magnesium sulfate and wollastonite, plasticizers such as triphenyl phosphate and phthalic acid esters, lubricants, stabilizers, flame retardants such as Sb$_2$O$_3$, halogen compounds and pohsphoric acid esters, dyes and pigments.

The method for producing the resin composition of the present invention is not limitative and any known methods can be used.

A method in which the components are mixed in the form of solutions and solvent is evaporated or in which said mixture is precipitated in a non-solvent, is effective. However, from industrial viewpoint, a method of kneading them in molten state is employed in practice. The melt kneading is carried out using such a kneading machine as generally used single- or twin-screw extruders and various kneaders. The twin-screw kneader is especially preferred.

Before kneading, it is preferred to uniformly blend respective resin components in the form of powder or pellet by using such a mixer as a tumbler or a Henschel mixer. However, each resin may be separately fed directly to a kneading apparatus through a metering device without the blending.

The kneaded resin composition can be molded by injection, extrusion or various other molding processes. The present invention further includes a method in which molded articles are obtained by dry-blending the components firstly at the time of injection molding or extrusion molding and then directly kneading the components during its operation of melt processing, without the previous kneading.

There is no special limitation in sequence of kneading the components. Respective components may be kneaded at the same time or polyphenylene ether resin (A) and compound (D) comprising dinitrodiamine may be previously kneaded to obtain a composition and then rubber-like polymer (C) and polyamide (B) may be kneaded with the composition, that is, respective components in molten state can be kneaded at two or more steps. Further, using a kneading machine having two or more introduction openings, components (A), (C) and (D) may be simultaneously introduced from the introduction openings of upperstream side and component (B) may be introduced from openings of downstream side. Any other sequences of kneading may also be employed.

The following examples are merely illustrative of the present invention and the present invention is not restricted to these examples. In the examples, deflection temperature under load (H.D.T.) and Izod impact strength (thickness: 3.2 mm) were measured according to JIS K7207 and JIS K7110, respectively.

REFERENCE EXAMPLE 1

Preparation of compound (D) comprising dinitrodiamine (i) In a one-liter four-necked flask equipped with a stirrer, a thermometer and a condenser was charged 156.8 g (1.76 mol) of 2-nitropropane and thereto were added 200 ml of methanol as a solvent and 16.7 g (0.04 mol) of 40% methanolic solution of trimethylbenzylammonium hydroxide. This mixture was heated to 50° C. and kept at that temperature and then thereto was added dropwise 136.3 g (1.68 mol) of 37% formalin over about 1 hour. Thereafter, the reaction mass was heated to 60° C. and thereto was added dropwise a solution of 86.5 g (0.8 mol) of p-phenylenediamine in 500 ml of methanol at 40° C. over about 1 hour. After completion of the addition, the reaction mass was kept at 60° C. for about 4 hours to precipitate crystals to form a slurry of the reaction mass.

This reaction mass was grudually cooled to 5° C. and then was filtrated to collect precipitated crystals. The crystals were washed with methanol and water and vacuum dried at a temperature lower than 50° C to obtain 226.3 g of N,N'-bis(2-methyl-2-nitropropyl)-1,4diaminobenzene (yield based on p-phenylenediamine: 91.1%). The resulting compound was light yellow crystal and had a melting point of 135–137° C. This compound is referred to as compound (a).

Results of elementary analysis of this compound are as follows:

|  | C | H | N |
|---|---|---|---|
| Found | 54.13% | 7.22% | 18.09% |
| Calcd. | 54.18% | 7.14% | 18.05% |

Furthermore, it was confirmed from FD-MASS, NMR spectrum and IR spectrum that this compound had a structure represented by the following formula:

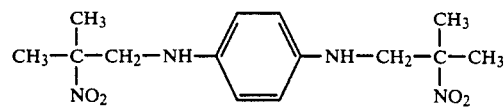

Dinitrodiamines shown in Table 1 were prepared in the same manner as above except that starting material was changed.

TABLE 1

| Compound | Name of compound |
|---|---|
| (b) | N,N'-bis(2-nitropropyl)-1,3-diaminobenzene |
| (c) | N,N'-bis(2-methyl-2-nitropropyl)-4,4'-diaminodiphenylmethane |
| (d) | N,N'-bis(1-nitrocyclohexylmethyl)-4,4'-diaminodiphenyl ether |
| (e) | N,N'-bis(2-methyl-2-nitrooctyl)-1,4-diaminobenzene |

(ii) In a one-liter four-necked flask equipped with a stirrer, a thermometer and a condenser were charged 116.2 g (1.0 mol) of 1,6-diaminohexane, 178.2 g (2.0 mol) of 2-nitropropane, and 140 g of methanol and then, under stirring, thereto was added dropwise 162.3 g (2.0 mol) of 37% formalin at 45–55° C. over one hour. After completion of addition of formalin, the mixture was kept at that temperature for one hour and then 200 ml of water was added thereto to carry out liquid-separation.

Oil layer was washed with 200 ml of water and then concentrated at 60° C. under 30 Torr to obtain 304 g of light yellow liquid. This liquid was subjected to high performance liquid chromatography to find that it contained 298 g of N,N'-bis(2-methyl-2-nitropropyl)-1,6-diaminohexane and 5 g of 2-nitropropane.

To this liquid were added 300 ml of n-hexane and 150 ml of toluene to dissolve the liquid and then the liquid was cooled to 5° C. to precipitate crystals to form a slurry. This mixture was filtrated and the resulting crystals were washed with 100 ml of cold n-hexane and vacuum dried at a temperature lower than 20° C. to obtain 288 g of N,N'-bis(2-methyl-2-nitropropyl)1,6-diaminohexane. This compound was light yellow crystal and had a melting point of 26–27° C. This compound is referred to as compound (f).

Elementary analysis values of this compound are as follows:

|  | C | H | N |
|---|---|---|---|
| Found | 52.69% | 9.45% | 17.57% |
| Calcd. | 52.81% | 9.50% | 17.60% |

Dinitrodiamines shown in Table 2 were prepared in the same manner as above except that starting material was changed.

TABLE 2

| Compound | Name of compound |
|---|---|
| (g) | N,N'-bis(2-methyl-2-nitropropyl)-1,2- |

TABLE 2-continued

| Compound | Name of compound |
|---|---|
| | diaminoethane |
| (h) | N,N'-bis(2-methyl-2-nitropropyl)-1,12-diaminododecane |
| (i) | N,N'-bis(2-methyl-2-nitropropyl)-1,18-diaminooctadecane |
| (j) | N,N'-bis(2-nitropropyl)-1,6-diaminohexane |
| (k) | N,N'-bis(2-methyl-2-nitropropyl)-1,4-bis-(aminomethyl)cyclohexane |
| (l) | N,N'-bis(2-methyl-2-nitropropyl)piperazine |

EXAMPLE 1

5 Kg of poly-2,6-dimethylphenylene ether having an intrinsic viscosity of 0.50 dl/g measured in chloroform at 30° C., 75 kg of polyamide (nylon 6 resin A-1030BRL manufactured by Unitika Ltd.), and 250 g of dinitrodiamine compound (D)-(a) mentioned in Reference Example 1-(i) were mixed by Henschel mixer and extruded at 250–300° C. by twin-screw extruder and then pelletized. The resulting pellets were vacuum dried at 130° C. for 3–4 hours and then were made into a test piece by injection molding. The test piece was sliced by microtome and subjected to etching with carbon tetrachloride, and diameter of dispersed particles of polyphenylene ether phase was observed by a scanning electron microscope to find that the polyphenylene ether phase was finely dispersed as particles of less than about 1 μ. When the test piece was immersed in chloroform at room temperature for 30 minutes, it showed no change.

Comparative Example 1

Example 1 was repeated except that the dinitrodiamine compound was not used. Dispersion state of polyphenylene ether phase and polyamide phase was inferior and agglomerates of about 10 μ or more of polyphenylene ether phase were seen. When the molded test piece was dipped in chloroform, it swelled and a part of the resin was dissolved out.

It can be seen from comparison of Example 1 with Comparative Example 1 that the composition of the present invention was superior in solvent resistance and compatibility between polyphenylene ether and polyamide was markedly improved.

EXAMPLES 2–13

The compound comprising the dinitrodiamine mentioned in Reference Example 1, the polyphenylene ether and the polyamide used in Example 1 and the rubber-like polymer shown in Table 3 were melt kneaded at the mixing ratio as shown in Table 3 by a twin-screw extruder at 250–300° C. to obtain pellets.

Then, the pellets were injection molded to obtain the given test piece and properties were measured. The results are shown in Table 3.

Comparative Example 2

Example 3 was repeated except that the compound comprising dinitrodiamine was not used. The results are shown in Table 3.

TABLE 3

| | Composition | | | | | | Izod impact strength (23° C., notched) kg · cm/cm | H.D.T. (18.6 kg/cm$^2$) °C. |
|---|---|---|---|---|---|---|---|---|
| | Polyphenylene ether resin (A) (Part by weight) | Polyamide (B) | | Rubber-like polymer (C)*$^1$ | | Dinitrodiamine compound (D) | | |
| | | Kind | Amount (Part by weight) | Kind | Amount (Part by weight) | Kind | Amount (Part by weight) | |
| Example | | | | | | | | |
| 2 | 70 | Nylon 6 | 30 | SBS | 12 | b | 1.0 | 21 | 140 |
| 3 | 60 | Nylon 6 | 40 | SEBS | 10 | c | 1.5 | 25 | 127 |
| 4 | 30 | Nylon 6 | 70 | St-EPR | 13 | d | 2.0 | 24 | 106 |
| 5 | 50 | Nylon 6 | 50 | M-SEBS | 15 | e | 1.5 | 36 | 125 |
| 6 | 60 | Nylon 6 | 40 | MEP | 20 | f | 3.0 | 45 | 130 |
| 7 | 60 | Nylon 6 | 40 | SEP | 15 | f | 1.0 | 33 | 133 |
| 8 | 60 | Nylon 6 | 40 | EMGMA | 10 | g | 2.0 | 25 | 138 |
| 9 | 40 | Nylon 6 | 60 | EPR | 20 | h | 0.8 | 31 | 112 |
| 10 | 70 | Nylon 6 | 30 | SEP | 13 | i | 1.5 | 28 | 150 |
| 11 | 45 | Nylon 6 | 55 | GMA-EPR | 15 | j | 2.0 | 30 | 128 |
| 12 | 65 | Nylon 6 | 35 | SEBS | 13 | k | 1.0 | 26 | 135 |
| 13 | 35 | Nylon 6 | 65 | MEP/SEP | 5/5 | l | 2.0 | 23 | 118 |
| Comparative Example 2 | 60 | Nylon 6 | 40 | SEBS | 10 | none | — | 4.2 | 114 |

Note:*$^1$
M-SEBS: Maleic anhydride modified hydrogenated styrene-butadiene-styrene block copolymer (KRATON ® FG-1901X manufactured by Shell Chemical Co.)
SEBS: Hydrogenated styrene-butadiene-styrene block copolymer (KRATON ® G-1650 manufactured by Shell Chemical Co.)
EMGMA: Ethylene-methacrylate-glycidyl methacrylate copolymer (ethylene/methacrylate/glycidyl methacrylate = 56.5/42/1.5 wt %)
SEP: Hydrogenated styrene-isoprene block copolymer (KRATON ® G-1701X manufactured by Shell Chemical Co.)
SBS: Styrene-butadiene-styrene block copolymer (CALIFLEX ® TR-1101 manufactured by Shell Chemical Co.)
GMA-EPR: Glycidyl methacrylate modified ethylene-propylene copolymer (EPR: ESPRENE ® E-120P manufactured by Sumitomo Chemical Co., Ltd., grafting ratio of glycidyl methacrylate: 0.7 wt %)
St-EPR: Styrene modified (grafted) ethylene-propylene copolymer (EPR: ESPRENE ® E-120P manufactured by Sumitomo Chemical Co., Ltd., styrene/ethylene-propylene = 40/100 wt %)
MEP: Maleic anyhdride modified ethylene-propylene copolymer (EP: ESPRENE ® E-120P manufactured by Sumitomo Chemical Co., Ltd., grafting ratio of maleic anhydride: 1.4 wt %)

The present invention provides a composition improved in compatibility between polyamide and polyphenylene ether and excellent in processability, solvent resistance and impact strength. Thus, the composition has a wide variety of uses.

This novel composition can be easily processed into shaped articles, sheets, films and the like by ordinary methods employed for thermoplastic resins such as injection molding and extrusion molding. These products are excellent in impact strength, heat resistance, oil resistance and processability. This composition is especially effective for injection molding.

We claim:

1. A resin composition which comprises:

100 parts by weight of a composition comprising (A) 5–95% by weight of a polyphenylene ether resin and (B) 95–5% by weight of a polyamide and 0.01–10 parts by weight, based on said composition comprising (A) and (B), of (D) a compound comprising a dinitrodiamine represented by the formula (I):

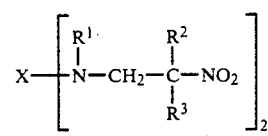

wherein X represents a divalent chain aliphatic, cycloaliphatic or aromatic group which may contain halogen or oxygen, $R^1$ represents a hydrogen atom, a chain aliphatic group, a cycloaliphatic group or an aromatic group and when X and $R^1$ are both chain aliphatic groups, the nitrogen atoms may further link to each other through $R^1$; $R^2$ and $R^3$ each independently represents a hydrogen atom or an alkyl group of 1–12 carbon atoms and $R^2$ and $R^3$ may link to each other to form a ring.

2. A resin composition according to claim 1, wherein the polyphenylene ether resin (A) is at least one resin selected from the group conisting of a polyphenylene ether and a modified polyphenylene ether.

* * * * *